(12) United States Patent
Barrett et al.

(10) Patent No.: US 7,421,739 B2
(45) Date of Patent: Sep. 2, 2008

(54) SYSTEM AND METHOD FOR MONITORING AND ENSURING DATA INTEGRITY IN AN ENTERPRISE SECURITY SYSTEM

(75) Inventors: Michael R Barrett, Phoenix, AZ (US); Michael Plummer, Chandler, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 752 days.

(21) Appl. No.: 10/711,768

(22) Filed: Oct. 4, 2004

(65) Prior Publication Data

US 2006/0075488 A1   Apr. 6, 2006

(51) Int. Cl.
H04L 9/32 (2006.01)
(52) U.S. Cl. .......................................... 726/26; 726/27
(58) Field of Classification Search .................. 726/1–3, 726/10, 14, 26–27; 713/189; 707/9–10, 707/200
See application file for complete search history.

(56) References Cited

U.S. PATENT DOCUMENTS

| 5,557,747 | A | 9/1996 | Rogers et al. |
| 5,611,048 | A | 3/1997 | Jacobs et al. |
| 5,694,595 | A | 12/1997 | Jacobs et al. |
| 5,822,434 | A | 10/1998 | Caronni et al. |
| 5,968,176 | A | 10/1999 | Nessett et al. |
| 6,158,010 | A | 12/2000 | Moriconi et al. |
| 6,243,815 | B1 | 6/2001 | Antur et al. |
| 6,263,446 | B1 | 7/2001 | Kausik et al. |
| 6,678,826 | B1 | 1/2004 | Kelly et al. |
| 6,678,827 | B1 | 1/2004 | Rothermel et al. |
| 6,714,930 | B1 * | 3/2004 | Garrison et al. ................. 707/9 |
| 2001/0007133 | A1 | 7/2001 | Moriconi et al. |
| 2001/0014912 | A1 | 8/2001 | Segal |
| 2001/0025346 | A1 | 9/2001 | Kayashima et al. |
| 2002/0002677 | A1 * | 1/2002 | Eade et al. ................... 713/164 |
| 2003/0028804 | A1 | 2/2003 | Noehring et al. |
| 2003/0065942 | A1 | 4/2003 | Lineman et al. |
| 2003/0093690 | A1 | 5/2003 | Kemper |
| 2003/0110397 | A1 | 6/2003 | Supramaniam et al. |
| 2003/0115322 | A1 | 6/2003 | Moriconi et al. |
| 2003/0115484 | A1 | 6/2003 | Moriconi et al. |
| 2004/0019807 | A1 | 1/2004 | Freund |
| 2004/0064727 | A1 | 4/2004 | Yadav |
| 2004/0083382 | A1 | 4/2004 | Markham et al. |
| 2004/0083386 | A1 | 4/2004 | Marquet et al. |

* cited by examiner

*Primary Examiner*—Hosuk Song
(74) *Attorney, Agent, or Firm*—Fitzpatrick, Cella, Harper & Scinto

(57) ABSTRACT

The invention facilitates monitoring and ensuring data security in security update information between software and hardware applications. The invention is achieved through an automated system that allows for substantial uniformity and substantially seamless security through a front-end system. The invention may use one or more third-party products to facilitate communication between computing platforms.

15 Claims, 7 Drawing Sheets

SYSTEM AND METHOD FOR MONITORING AND ENSURING DATA INTEGRITY IN AN ENTERPRISE SECURITY SYSTEM

FIELD OF INVENTION

This application generally relates to software security applications, and more particularly, to a system and method for monitoring and ensuring data integrity in security systems.

BACKGROUND OF INVENTION

An Enterprise Security System (ESS) typically includes a single, central, security repository such that, for example, ESS may register and control access for all users of systems residing on all platforms. As such, if a user desires access to a specific system and/or application, a front-end ESS system may control the access.

Remote Access Control Facility (RACF) is known as the back-end security engine used in IBM mainframe platforms. Because RACF terminology and coding language may be difficult to learn and understand, the ESS often re-formats security commands into RACF commands because ESS is easier to use and understand. Thus, RACF security may be updated by individuals and/or programs that do not know RACF terminology. While security updates should originate in ESS and be transferred to RACF, sometimes the updates originate in the RACF back-end. Accordingly, these inconsistencies often cause computing access failures, delays, and confusion.

SUMMARY OF INVENTION

The invention discloses systems and methods for facilitating the monitoring and ensuring data integrity in security across multiple platforms. The invention also provides a substantially seamless security administration across multiple platforms by, for example, monitoring and/or preventing back-end updates to an Enterprise Security System (ESS) to ensure that security access is controlled from one, centralized location. More particularly, in one embodiment, the system detects a back-end security update in a back-end database, compares the back-end security update to front-end security information stored on a front-end database; and reconstructs the back-end database to conform to the front-end database.

BRIEF DESCRIPTION OF DRAWINGS

A more complete understanding of the present invention may be derived by referring to the detailed description and claims when considered in connection with the figures, where like reference numbers refer to similar elements throughout the figures, and:

DETAILED DESCRIPTION

Figure 1:
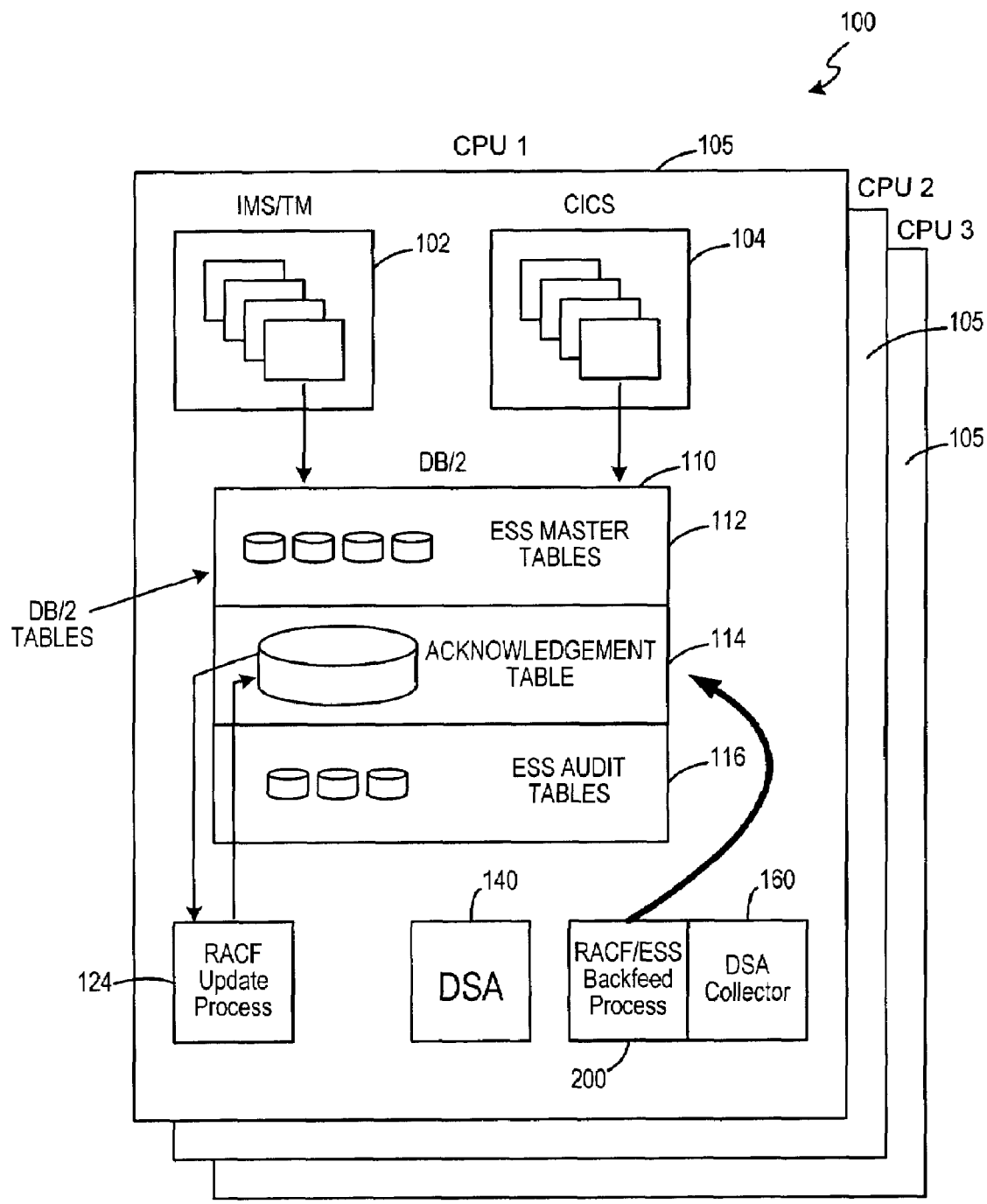
FIG. 1 presents a block diagram illustrating an exemplary overview of a front-end ESS system of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices.

These software components may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These software components may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The software components may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The software components of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

In general, in accordance with various aspects and embodiments of the present invention, a backfeed process for an Enterprise Security System (ESS) is provided which is configured to, for example, provide monitoring and ensuring data integrity of back-end updates originating in RACF from being non-conforming to the security information updated and available on the ESS system. By monitoring and ensuring data integrity, the backfeed process and/or any other part of an ESS may be configured to monitor update information, detect update information, analyze update information, transfer update information, compare update information, report update information, change update information and/or execute any other process to ensure the integrity of the data and/or other update information on the ESS system. The ESS system includes an administration system that allows substantially seamless security across multiple platforms. ESS allows for centralized updates to security protocols, such as, for example, deletion of IDs, updating of passwords, and access control for departments, groups, users and resources. ESS is configured to manage the security engine (e.g., IBM's Remote Access Control Facility (RACF)) for all or most computing platforms. While an exemplary RACF engine is discussed and depicted for purposes of illustration throughout, the security engine may be any known security engine in the art, including, but not limited to RACF, Computer Associate's Access Control Facility 2 (CA-ACF2), and/or Lightweight Directory Access Protocol (LDAP). For example, users may use ESS, but the users may not understand RACF, CA-ACF2, and/or LADP terminology, but the system reformats security requests into RACF, CA-ACF2, and/or LADP commands. ESS may also be configured to operate with one or more processes to find and/or send updated security commands (i.e., RACF commands) from the front-end ESS system to the back-end (i.e., RACF) security system.

With reference to FIG. 1, an exemplary overview of the front-end 100 of the ESS system is depicted. Front-end 100 illustrates the exemplary relationship between the various computing platforms and processes of the ESS system. Front-end 100 may be configured to comprise one or more central processing units (CPUs) 105 operating across one or more platforms. Each CPU 105 may be configured to run transactions via an Information Management System/Transaction Manager (IMS/TM) 102 and/or a Customer Information Control System (CICS) 104 mainframe system. The ESS system may be configured to use software, such as, for example, Information Engineering Facility (IEF) software and/or Advantage Gen software, to generate code from graphical business process models for running transactions on IMS/TM and/or CICS. Front-end 100 may also be configured with a main IBM database (DB/2) repository 110 for storing all ESS tables for transferring and comparing information with back-end RACF databases. The back-end RACF databases will be described in greater detail herein.

Repository 110 may be structured with one or more ESS master tables 112, one or more acknowledgement tables 114, and/or one or more ESS audit tables 116 to facilitate storing and processing database information. Master tables 112 may be configured to store a copy of the information stored on the back-end RACF databases. Acknowledgement tables 114 may be used to facilitate the transfer of information from repository 110 to the RACF databases. Acknowledgement tables 114 may be used to facilitate writing ESS update information into RACF command format. Audit tables 116 may be configured to compare and display the information from RACF databases before and after the RACF databases are updated. Repository 110 may include one or more other security and/or encryption schemes to limit access. For example, repository 110 may be configured with any of various suitable security features, such as firewalls, access codes, encryption, de-encryption, compression, decompression, and/or the like. Repository 110 may be configured to be implemented within IBM's DB/2 relational database management system for Multiple Virtual storage (MVS) operating system users. Repository 110 may be configured for administrative use only. As a result, the individual security databases used by platform-specific security managers may still contain the information needed to perform local security authorizations. That is, a front-end user/administrator may use ESS to provide a second user access to a resource without the user/administrator having access to the resource himself.

Master tables 112, acknowledgement tables 114, and/or audit tables 116 may be configured to permanently and/or temporarily store RACF information before it is applied to RACF. Information may include update information, status changes, user-IDs, commands, revocation information and/or authorization information. In one embodiment, passwords associated with user IDs may not be stored in repository 110.

Repository tables 112, 114, and 116 may be configured to facilitate encryption of data. In one embodiment, every row within tables 112, 114, and/or 116 may be stamped with a non-forgeable token. Authorized processes may be configured to generate this token and write rows into the tables. Processes running on a system may be required to validate the token in order to proceed. Encryption tokens may also be used for the transfer of information between ESS and Transaction Processing Facility (TPF) systems and/or ESS and any other system.

Front-end 100 may include various processes in accordance with the present invention to facilitate updating and tracking security administration. Again, with reference to an exemplary embodiment depicted in FIG. 1, a RACF Update Process (UP) 124 may interact with repository 110 to apply the changes generated in front-end 100 to local and/or remote RACF databases. A RACF/ESS Backfeed Process (BP) 200 may be configured to facilitate reading security information generated through RACF and compare it to information on repository 110. If any discrepancies exist, BP 200 may be configured to update RACF with the information contained on repository 110. These processes will be described in greater detail below. Front-end 100 may also be configured with a third-party product such as Distributed Security Administration (DSA) 140 to facilitate synchronization of the contents of one or more RACF databases with one another. DSA 140 may run on each CPU 105 to facilitate transferring information from various RACF pre- and post-processing exits. DSA 140 may also be configured to facilitate capturing RACF pre- and post-processing exit information into DSA 140 address space. DSA 140 may then forward the information to peer DSA processes running other CPUs. The peer DSA processes may then be used to facilitate uploading the information onto local RACF databases.

Front-end 100 may also be configured to be consistent with industry directions, particularly Distributed Computing Environment (DCE) and DCE Security Services (i.e., Kerberos). Front-end 100 may be configured to be inter-operable with other security managers such as RACF and TPF products. Front-end 100 may also be configured to link separate security managers together. Front-end 100 may also be configured to facilitate access to administration transactions from any CPU. For example, front-end 100 may use the Multiple Systems Coupling (MSC) feature of IMS/TM to provide access to users across all platforms. The transactions may be defined as remote on remote CPUs in order to enable IMS to remotely schedule the transactions to execute on the system where ESS resides.

DSA 140 may also be configured to provide a "collector option" to support BP 200. For example, DSA 140 may be one or more computing platforms. DSA 140 may be configured to use a specific address (e.g., DSA collector 160) to facilitate capture and/or transfer of updates to and from RACF databases. DSA collector 160 may be configured to use term rewriting system (TRS) exits to transform terms (i.e., expressions, strings, etc.) into equivalent terms. DSA collector 160 may use the TRS exits to facilitate the capture and/or transfer of RACF updates to BP 200. DSA collector 160 may also be configured to transfer RACF changes across multiple CPUs 105. In another embodiment, each CPU 105 may be configured with individual DSA collectors 160 to facilitate the capture and/or transfer of RACF updates to/from local BPs 200.

Figure 2:
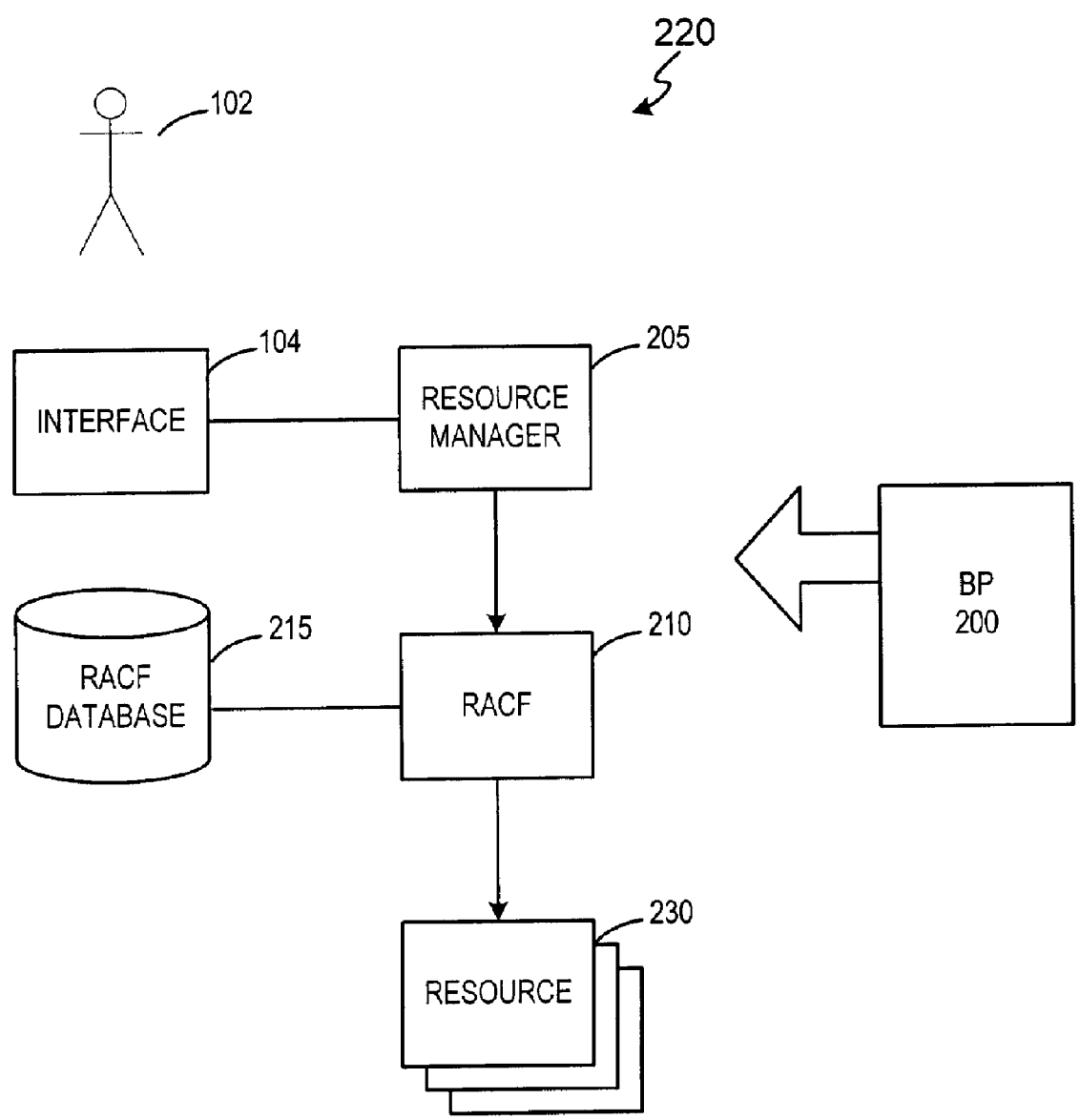
FIG. 2 presents a block diagram illustrating an exemplary overview of a back-end system of the present invention.

An exemplary overview of the back-end 220, in accordance with the present invention, is illustrated in FIG. 2. Back-end 220 may include a resource manager 205 that uses RACF 210 to facilitate verification of whether a user 102 has access to one or more resources 230. RACF may use RACF database 215 to authorize user's 102 access to resource 230. Database 215 may contain information about users, resources and access authorities. Upon authorization, RACF 210 may supply the authorization information to resource manager 205 which may then inform user 102 whether authorization has been accepted or denied.

As used herein, user 102 may include any external or internal person, employee, officer, entity, merchant, business, client, corporation, customer, contractor, administrator, operator, customer service representative, third-party provider, user, web service consumer, computing system, hardware and/or software. User 102 may interact through an interface 104 via any communication device, protocol, hardware and/or software discussed herein. User 102 may be in a home or business environment with access to a network. In an exemplary embodiment, access is through the Internet through a commercially available web-browser software package.

As used herein, the term network shall include any electronic communications means which incorporate both hardware and software components of such. For example, a network may include any distributed system, such as a mainframe complex, thin cable network, Ethernet, token ring network, Intranet, Internet, Local Area Network (LAN), wide area network (WAN), and/or any other method or system of communications described herein.

Resource 230 may be any application, transaction process, database, protocol, system, script, hardware, software, program, equipment, area, lab, device, and/or any other type of resource. Authorized, as used herein, may include a user possessing clearance, passwords, identification, and/or any other pre-approved and/or other secure means to access a resource.

The user computer may provide a suitable website or other Internet-based graphical user interface which is accessible by user 102. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system. Any of the communications, inputs, storage, databases or displays discussed herein may be facilitated through a website having web pages. The term "web page" as it is used herein is not meant to limit the type of documents and applications that might be used to interact with user 102. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a browser, which includes a URL and an IP address. The web service retrieves the appropriate web pages and sends the web pages to the IP address.

The user computer and/or interface 104 may include any remote interface or terminal through which user 102 may remotely access any option or function associated with front end 100 and/or back-end 220. The user computer and/or interface 104 may include any of the input devices, computing units, or computing systems described herein, such as, for example, kiosk, personal digital assistant, handheld computer (e.g., Palm Pilot®, Blackberry®), cellular phone and/or the like. Access may also be obtained using a conventional card reader which recognizes a magnetic stripe or bar code associated with appropriate user identification information, a biometric device, a smart card reader which recognizes information stored on a microchip integrated with appropriate user identification information, a pervasive computing and/or system (i.e., a domestic appliance or financial institution network), and/or any other device capable of accessing, interacting, transmitting, receiving, downloading, and/or uploading application related data transmitted electronically, magnetically, optically, and/or the like.

In an exemplary embodiment, and with reference to FIG. 2, communication between user 102 and resource 230 may be accomplished through interface 104. Communication may comprise any suitable communication means, such as, for example, a telephone network, an extranet, an intranet, Internet, point-of-interaction device (point-of-sale device, personal digital assistant, cellular phone, kiosk, etc.), online communications, off-line communications, wireless communications, transponder communications, local area network (LAN), wide area network (WAN), networked or linked devices and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computing units discussed herein may be connected with each other via a data communication network, such as, for example, interface 104. Interface 104 may be a public network and assumed to be insecure and open to eavesdroppers. In the illustrated implementation, interface 104 may be embodied as the Internet. In this context, the computers may or may not be connected to the Internet at all times. For instance, user 102 may be using a computer that employs a modem to occasionally connect to the Internet, whereas the various components, programs and applications might be running on servers that maintain a permanent connection to the Internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAINED (1997). All of these texts are hereby incorporated by reference.

A variety of conventional communications media and protocols may be used for data links such as, for example, a connection to an Internet Service Provider (ISP) over the local loop as is typically used in connection with standard modem communication, cable modem, Dish networks, ISDN, Digital Subscriber Line (DSL), or various wireless communication methods. User 102 might also reside within a local area network (LAN), which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference. It will be appreciated that many aspects of the present invention could be formulated, such as, for example, one skilled in the art will appreciate that interface 104 may include any system or interface for exchanging data or transacting business, such as the Internet, an intranet, an extranet, WAN, LAN, satellite communications, and/or the like. It is noted that a network may be implemented as other types of networks, such as an interactive television (ITV) network.

Front-end 100 and/or back-end 220 may be a stand-alone system or incorporated into any pre-existing network or via any software and/or hardware customization or upgrades. Front-end 100 and/or back-end 220 may include any hardware and/or software discussed herein. Front-end 100 and/or back-end 220 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, employee data, resource data, application and/or like data that could be used in association with the present invention. As those skilled in the art will appreciate, front-end 100 and/or back-end 220 will typically include an operating system (e.g., MVS, Windows NT, 95/98/2000/XP, Linux, Solaris, AIX, etc.) as well as various conventional support software and drivers typically associated with computers.

Similarly, front-end 100 and/or back-end 220 may include, or be used in conjunction with, any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, the invention may be implemented using TCP/IP communications protocols, IPX, Appletalk, IP-6, NetBIOS, OSI or any number of existing or future protocols.

Any databases discussed herein, such as database 215 and/or repository 110, may be any type of database, such as relational, hierarchical, graphical, object-oriented, and/or other database configurations. Common database products that may be used to implement the databases include the aforementioned DB/2 system by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system ; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data, which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the network. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations is further discussed herein.

BP 200 may be configured to operate alongside RACF 210 to monitor security updates originating within RACF 210. BP 200 may also be configured to compare the information in the RACF updates with information stored in master tables 112 within repository 110. If the information from the RACF updates does not match the master table 112 information, BP 200 may be used to facilitate updating repository 110 with the information from RACF 210. BP 200 may also be configured to facilitate restoration of RACF 210 with the information stored in master tables 112. The latter option may be used to prevent back-end updates to the RACF security system. These BP 200 configurations will be described in greater detail below. In an exemplary embodiment, BP 200 may operate in real-time. In this context, "real-time" may include BP 200 information being immediately, or nearly immediately, updated at the time the changes or other transactions are completed. As such, BP 200 may immediately view or manage the changes within RACF 210 and repository 110 and/or RACF 210 may be immediately updated to ensure seamless security. However, one skilled in the art will appreciate that BP 200 may operate in any less than real-time mode, such as, for example, batch processing. In another exemplary embodiment, BP 200 may operate partially in real-time and partially in batch mode, wherein during batch mode, RACF 210 and/or repository 110 security information is stored, and periodically updated to repository 110 and/or RACF 210.

Figure 3:
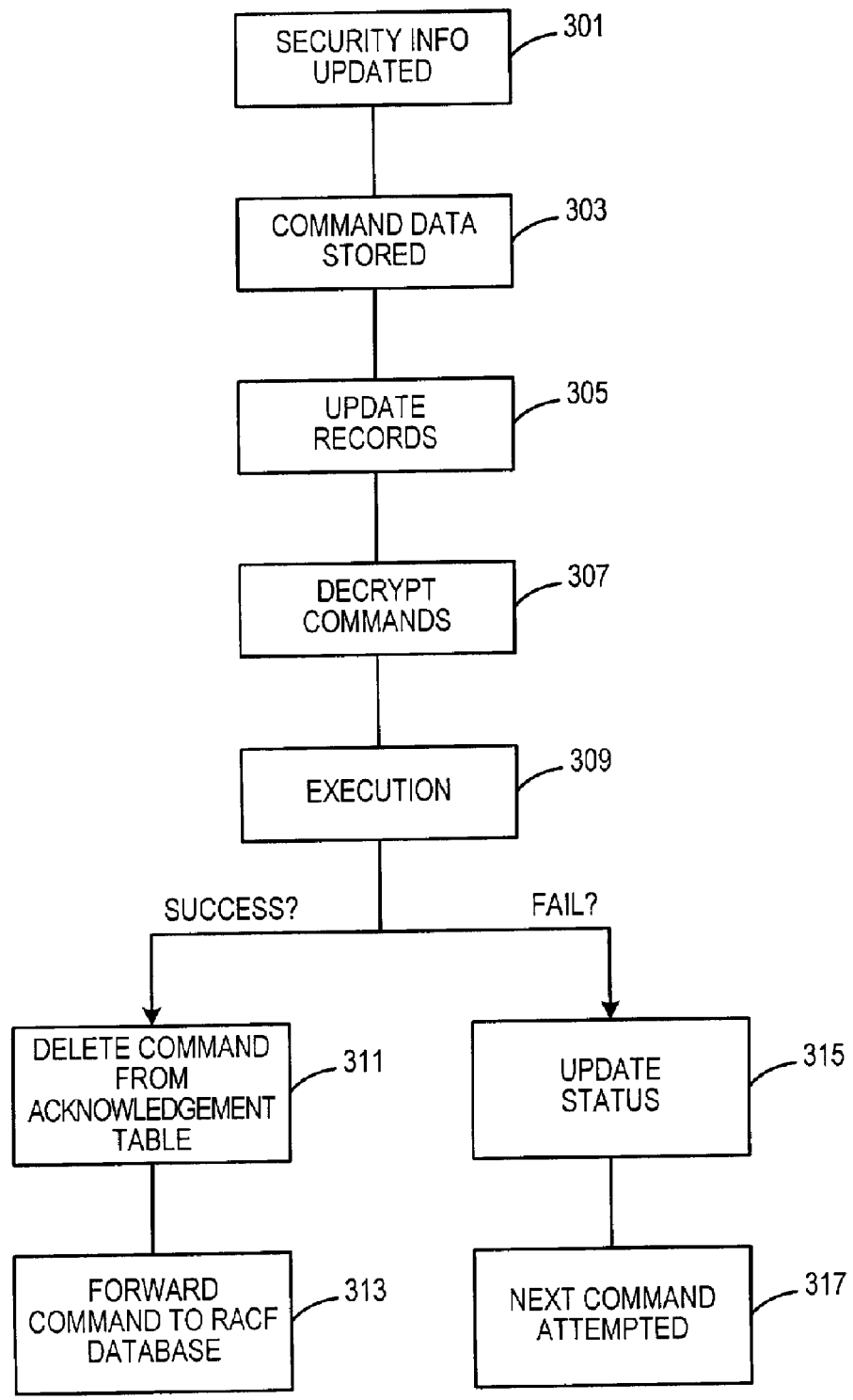
FIG. 3 presents a flowchart illustrating an exemplary update process in accordance with the present invention.

To better understand the backfeed update process of the present invention, an exemplary RACF/TPF update process 124 is set forth in FIG. 3. The exemplary update process is configured to take commands generated in ESS administrative front-end 100 and apply the commands to RACF database 215. UP 124 may use Time Sharing Option (TSO) command level interfaces and/or low level interfaces such as ICHEINTY to facilitate the update process. ICHEINTY is a macro that may be configured to provide a direct interface to RACF database 215 to facilitate locating and/or updating a user's security profile. UP 124 may also use various communication mechanisms to facilitate the update process, including the IMS MSC system. UP 124 may also use various encryption and decryption methods and commands known in the art.

In an exemplary method, UP 124 may initiate when security information is updated (step 301) by a user and/or system in front-end 100. The information may then be stored (step 303) in command data format on repository 110. UP 124 may then read the commands (step 305) from acknowledgement table 114 within repository 110. UP 124 may be configured to read the commands by selecting all eligible rows from acknowledgement table 114 and sort them into ascending date/time-stamp order to ensure correct sequencing. Upon reading the commands, UP 124 may be configured to decrypt the commands (step 307) for execution (step 309). During the execution step, UP 124 may be configured to use other applications, such as, for example, a TSO command processor, to facilitate execution of the commands. If the commands succeed, UP 124 may delete (step 311) the commands from repository 110. UP 124 may then use DSA 140 to forward the commands to RACF databases 215 (step 313). Alternatively, if the commands fail, UP 124 may write status information regarding the failure into repository 110 (step 315). UP 124 may also be configured to attempt execution of the next command (step 317).

DSA 140 may be any security administration product used to synchronize the contents of the various RACF databases. In one embodiment, DSA 140 is a Distributed Security Administration product distributed by Plato software. DSA 140 may be configured to communicate with other DSA systems on other CPUs using any communication means known in the art. In one embodiment, DSA 140 may be configured to use one or more Virtual Telecommunications Access Method (VTAM) facilities to facilitate communication across multiple platforms. DSA 140 may also be configured with a request/acknowledgement based store and forward scheme, a queue capability for updates, encryption and decryption means, modifiable standard exit points, and the aforementioned "collector option."

The term command, as used herein, may refer to password and/or user ID changes, revocation of user IDs, passwords, resumes of user IDs and passwords, and/or any other RACF-compatible command. Command information may relate to the distribution of security profiles, that is, it may relate to access control between users, groups and resources. For example, front-end 100 may be configured to use architectural hierarchy similar to that of RACF database 215. As such, front-end 100 may group users together based upon the different users' job functionality. In turn, each group may require access to various resources to facilitate the group's job functions. As such, front-end 100 may be configured to connect users to one or more groups (and thereby provide them access to resources associated with each group). DSA 140 may be used to translate and/or transfer front-end 100 security information into this RACF-architectural hierarchy.

Figure 4:
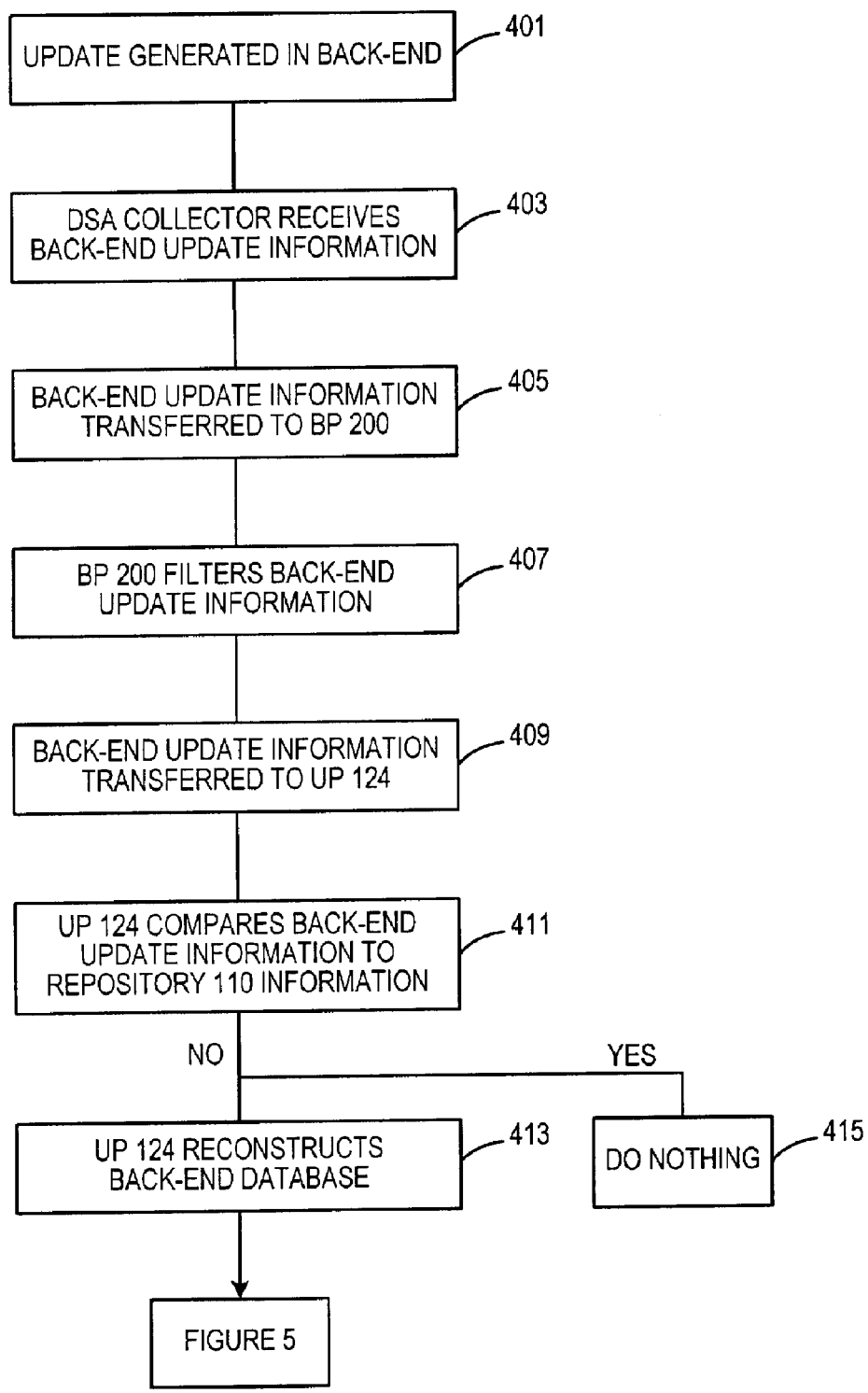
FIG. 4 presents a flowchart illustrating an exemplary backfeed process in accordance with the present invention.

In accordance with another aspect of the invention, and illustrated in FIG. 4, an exemplary RACF/ESS BP 200 is described. One exemplary purpose of BP 200 is to find update information originating within RACF and compare it with the information stored in repository 110. If the update information is not identical or substantially identical to repository 110 information, BP 200 may then update repository 110 information and/or update the RACF information so that the two information sources conform to one another. This process may be achieved through the following series of steps.

User 102 may generate an update (step 401) through back-end 220. In order to detect this back-end update, DSA collector 160 may be configured to receive any back-end update information (step 403) and transfer the update information to BP 200 (step 405). The transfer of update information may occur via a regular call and/or any other communication means described herein. By transferring via a regular call, DSA collector 160 may use the same Task Control Block (TCB) as BP 200 to communicate information about tasks (i.e., back-end updates) within its address space. Through this TCB, BP 200 may use DSA 140 and/or DSA collector 160 to facilitate access to repository 110.

Once BP 200 receives update information from DSA collector 160, BP 200 may be configured to filter (step 407) the information. By filtering, BP 200 may scan the update information from RACF databases 215 to determine whether any of the updates should have been made through front-end 100. For example, it may be desirable to control some security information through back-end 220 instead of front-end 100. BP 200 may filter out the security updates that may originate in back-end 220 so that they are not updated and/or compared with front-end 100 information. BP 200 may be configured to employ naming conventions to facilitate a determination of whether any back-end updates should have been made through front-end 100. For example, if an ESS user-ID has been revoked in back-end 220, BP 200 will be able to detect this revocation. BP 200 may also be configured to transfer information about this back-end revocation to UP 124 using DSA 140 and/or DSA collector 160 (step 409).

UP 124 may be configured to compare the back-end information (i.e., information about the revocation) to information stored in repository 110 (step 411). If the back-end information does not conform to the information in repository 110, UP 124 may reconstruct RACF database 215 (step 413) so that the back-end information conforms to the information stored in repository 110. Alternatively, if the back-end information conforms to the information in repository 110, UP 124 does not proceed and the process terminates (step 415).

Figure 5:
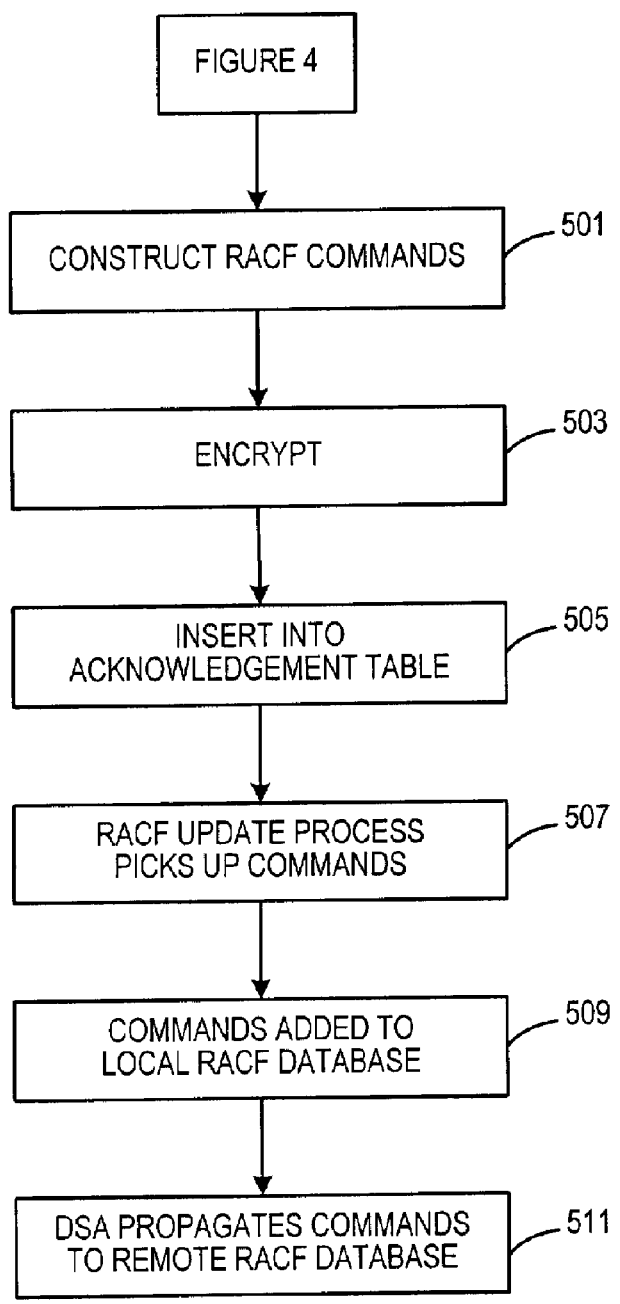
FIG. 5 presents a flowchart illustrating an exemplary backfeed process in accordance with the present invention.

To reconstruct RACF database 215, and with reference to an exemplary method depicted in FIG. 5, UP 124 may be configured to construct the proper RACF commands at the front-end (step 501). By constructing the proper RACF commands, UP 124 may use any software and/or hardware means to convert repository 110 information into RACF-compatible commands. The commands are RACF compatible in order to facilitate back-end reconstruction of RACF database 215. Once UP 124 constructs the proper commands, UP 124 may encrypt the commands (step 503) using any encryption method described herein. Upon encryption, UP 124 may insert the RACF commands into acknowledgement table 114 within repository 110 (step 505). BP 200 may then facilitate transfer of the RACF commands (step 507) to back-end 220. BP 200 may also facilitate adding the commands to local RACF database 215 (step 509). BP 200 may use DSA 140 and/or DSA collector 160 to propagate the commands and/or update information to one or more remote RACF databases 215 (step 511).

While FIG. 5 illustrates an exemplary method for reconstructing RACF database 215, reconstructing a security database, such as RACF 215, may comprise a plurality of steps, including, but not limited to matching information stored on a back-end database to information stored on a front-end database, detecting non-conforming information between a back-end and front-end database, generating one or more counteracting commands and/or command sequences, transferring the counteracting commands and/or command sequences between a front-end and a back-end system, and/or executing the counteracting commands and/or command sequences on a front-end and/or a back-end system. The phrase counteracting commands and/or command sequences, as used herein, may refer to any command, script, program, protocol, process and/or other computing device used to conform back-end database information to front-end database information.

Figure 6:
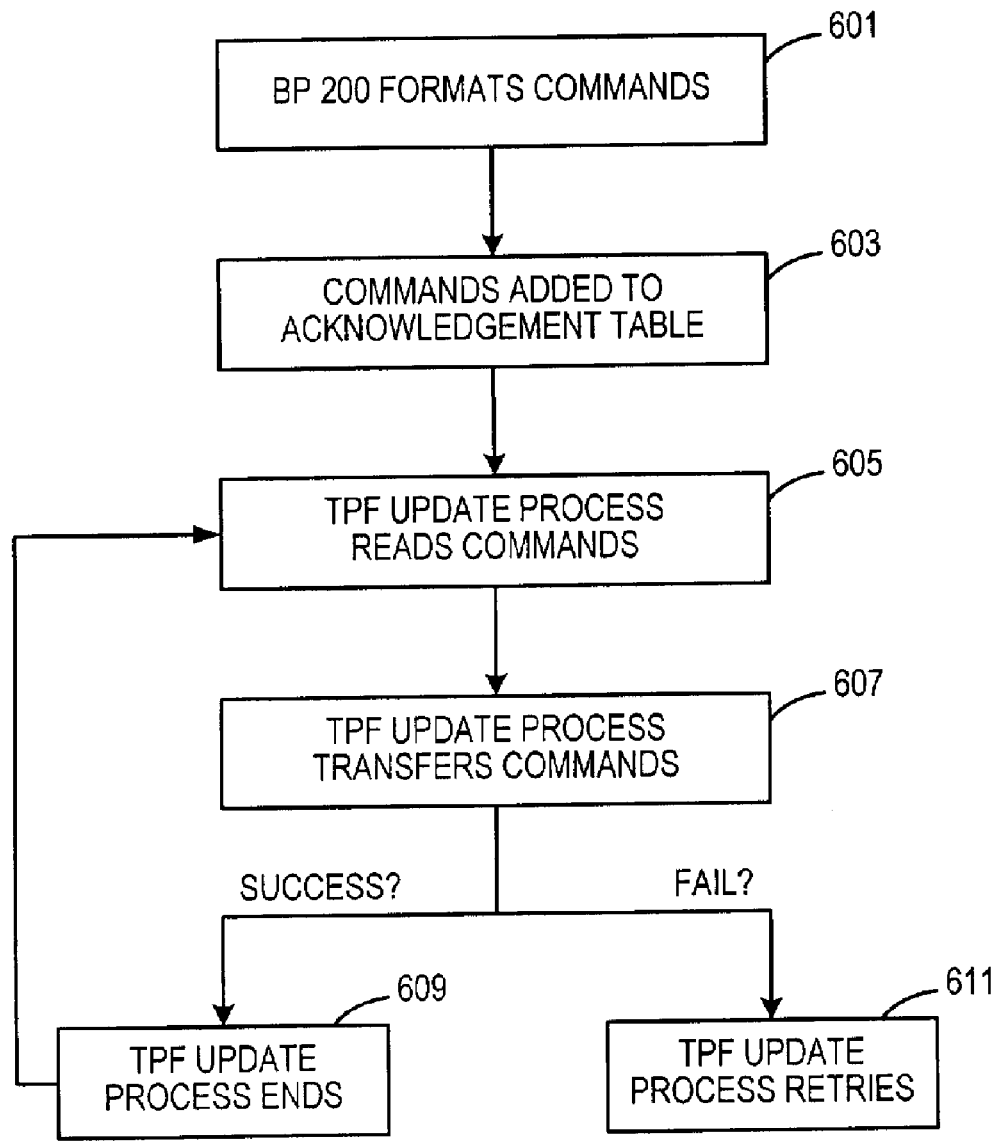
FIG. 6 presents a another exemplary update process in accordance with the present invention.

In accordance with another exemplary embodiment, BP 200 may be configured to route updates that have originated and/or occurred in RACF 210 to a Transaction Processing Facility (TPF) operating system operating on one or more mainframes connected to a computing system. Routing may be used when a user has access to resources controlled by both RACF 210 and TPF. For example, if user 102 with access to RACF and TPF changes his password through front-end 100, DSA 140 may be configured to update all or any portion of RACF databases 215 with the new password. BP 200 may then be used to route the password update to one or more TPF systems. For example, with reference to an exemplary method illustrated in FIG. 6, BP 200 may be configured to format commands relating to a front-end 100 update (step 601) to send to TPF. BP 200 may add the formatted commands to acknowledgement table 114 (step 603). A TPF Update Process may then be used to transfer the update commands to the correct TPF systems. The TPF Update Process may be configured to operate in a similar way as UP 124 and is described in greater detail below. The TPF Update Process may be configured to facilitate reading commands from acknowledgement table 114 (step 605) and transferring the commands to one or more update programs residing on the various TPF systems (step 607). If the transfer succeeds, TPF update process may be configured to terminate until the next update is needed (step 609). If the transfer fails, TPF update may be configured to re-run the process one or more times if desired (step 611).

Figure 7:
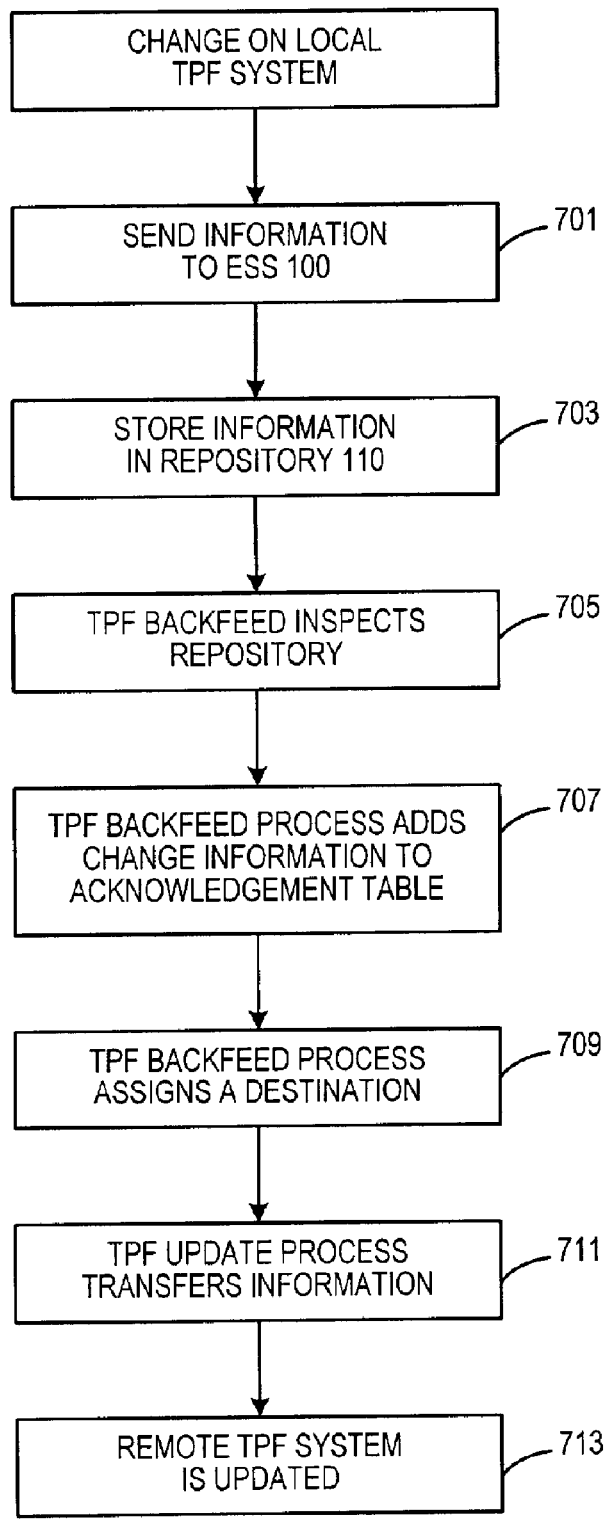
FIG. 7 presents a flowchart illustrating another exemplary backfeed process in accordance with the present invention.

In another exemplary embodiment, and with reference to FIG. 7, the system may be configured with a TPF/ESS backfeed process similar to BP 200. TPF/ESS backfeed process may be used to facilitate communication between TPF systems residing on different CPUs 105 because TPF to TPF communication may be difficult or may not exist at all. For example, if user 102 changes his password in one TPF system, the information regarding the new password may be sent to front-end 100 (step 701) and stored in repository 110 (step 703). TPF/ESS backfeed process may be configured to inspect repository 110 (step 705) and add the new password change information to acknowledgement table 114 (step 707). When adding the new change information, TPF/ESS backfeed process may assign a destination (i.e., a remote TPF system) to the change (step 709). TPF update process may then be used to transfer the change information to the specified destination (step 711). The remote TPF system may then be updated with the new information (step 713).

TPF backfeed and/or update processes may be any protocol, software, application, program, script, and/or any other type of process for facilitating transfer of commands from repository 110 tables to one or more TPF systems. TPF backfeed and/or update processes may be configured to use Advanced Program-to-Program Communications (APPC) to facilitate communication and transfer of commands. TPF backfeed and/or update processes may also be configured to employ Common Program Interface (CPI) language capabilities to facilitate communication with remote TPF update programs. The update programs may be partner programs on TPF systems. The update programs may be any protocol, software, application, process, script, and/or any other type of program for facilitating communication with TPF backfeed and/or update processes and updating TPF security databases. The update programs may also be configured to use CPI language capabilities.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method for facilitating changes to security systems, said method including:
    detecting a back-end security update in a back-end database;
    detecting non-conforming information between said back-end database and a front-end database storing front-end security information;
    generating an update command for reconstructing said back-end database to conform to said front-end database and storing said update command in at least one of said back-end database and said front-end database; and
    executing said update command.

2. The method according to claim 1, further comprising the step of filtering back-end database information.

3. The method according to claim 2, wherein said step of filtering back-end database information includes employing naming conventions.

4. The method according to claim 1, further comprising the step of transferring information from said back-end database to said front-end database.

5. The method according to claim 1, wherein said back-end security update is a Remote Access Control Facility (RACF) update.

6. The method according to claim 1, wherein said back-end security update is a Transaction Processing Facility (TPF) update.

7. The method according to claim 1, wherein said back-end security update is a Computer Associate's Access Control Facility 2 (CA-ACF2) update.

8. The method according to claim 1, wherein said back-end security update is a Lightweight Directory Access Protocol (LDAP) update.

9. The method according to claim 1, wherein said step of generating the update command further includes at least one of the steps of:
    matching information stored on a back-end database to information stored on a front-end database,
    generating a counteracting command sequence,
    transferring said command sequence from a front-end system to a back-end system, and
    executing said command sequence.

10. A security system including:
    a device configured to detect a back-end security update on a back-end database;
    a device configured to detect non-conforming information between said back-end database and a front-end database storing front-end security information; and
    a device configured to generate and execute an update command for reconstructing said back-end database to conform it to said front-end database.

11. The system according to claim 10, wherein said devices are configured to operate in one of a real time and batch processing mode.

12. The system of claim 10, wherein said front-end database includes two or more data tables.

13. The system of claim 10, wherein said device configured to detect said back-end security update is further configured to filter back-end update information.

14. A method for facilitating changes to security systems, said method including:
    sending a back-end update from a local back-end system to a front-end database;
    detecting said back-end update on said front-end database;
    formatting said back-end security update to create an update command;
    transferring said update command to a remote back-end system; and
    executing said update command to reconstruct said back-end database.

15. The method of claim 14, wherein said step of formatting includes assigning a destination to said update command.

* * * * *